(12) United States Patent
Yun

(10) Patent No.: US 12,084,901 B2
(45) Date of Patent: Sep. 10, 2024

(54) SLIDING DOOR DEVICE FOR VEHICLE

(71) Applicants: Hyundai Motor Company, Seoul (KR); Kia Corporation, Seoul (KR)

(72) Inventor: Hyungin Yun, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 17/949,839

(22) Filed: Sep. 21, 2022

(65) Prior Publication Data

US 2023/0193676 A1 Jun. 22, 2023

(30) Foreign Application Priority Data

Dec. 20, 2021 (KR) .......................... 10-2021-0182523

(51) Int. Cl.
*E05D 15/00* (2006.01)
*B60J 5/04* (2006.01)
*E05D 3/02* (2006.01)
*E05D 15/06* (2006.01)
*E05D 15/10* (2006.01)

(52) U.S. Cl.
CPC ........ *E05D 15/1047* (2013.01); *B60J 5/0468* (2013.01); *B60J 5/047* (2013.01); *E05D 3/02* (2013.01); *E05D 15/0665* (2013.01); *E05D 15/0686* (2013.01); *E05D 15/0691* (2013.01); *E05D 15/1081* (2013.01); *E05D 2015/1055* (2013.01); *E05D 2015/1092* (2013.01); *E05Y 2201/628* (2013.01); *E05Y 2201/64* (2013.01); *E05Y 2201/684* (2013.01); *E05Y 2600/41* (2013.01); *E05Y 2600/626* (2013.01); *E05Y 2900/531* (2013.01)

(58) Field of Classification Search
CPC .................................................. E05D 15/1047
See application file for complete search history.

(56) References Cited

U.S. PATENT DOCUMENTS

| 6,367,202 B1* | 4/2002 | Reed ................... B60R 13/0243 |
| | | 381/86 |
| 2016/0272053 A1* | 9/2016 | Maruyama .............. E05D 13/04 |
| 2020/0181968 A1* | 6/2020 | Suzuki ................ E05D 15/1047 |
| 2021/0172236 A1* | 6/2021 | Choi ....................... E05D 15/48 |

FOREIGN PATENT DOCUMENTS

KR 10-2016-0054223 A 5/2016

* cited by examiner

*Primary Examiner* — Daniel J Troy
*Assistant Examiner* — Daniel Alvarez
(74) *Attorney, Agent, or Firm* — MORGAN, LEWIS & BOCKIUS LLP

(57) ABSTRACT

A sliding door device for a vehicle includes a door panel for opening and closing a door opening and covered by an upper trim and a lower trim, and a center rail mounted on the door panel to extend in a longitudinal direction of the vehicle body and providing a path for a center roller mounted on a center portion of the vehicle body, wherein a lower portion of the upper trim and an upper portion of the lower trim are disposed to overlap each other vertically. The center roller is mounted on a center roller mounting bracket including a first surface extending toward the vehicle body to be vertical to the door panel, a second surface bent from the first surface toward a lower side of the vehicle body, and a third surface extending from the second surface toward the vehicle body to be vertical to the door panel.

10 Claims, 9 Drawing Sheets

SLIDING DOOR DEVICE FOR VEHICLE

CROSS-REFERENCE TO RELATED APPLICATION

The present application claims priority to Korean Patent Application No. 10-2021-0182523 filed on Dec. 20, 2021, the entire contents of which is incorporated herein for all purposes by this reference.

BACKGROUND OF THE PRESENT DISCLOSURE

Field of the Present Disclosure

The present disclosure relates to a sliding door device for a vehicle. The present disclosure relates to a sliding door device for a vehicle, configured to open or close a door opening of a vehicle body by sliding back and forth in a longitudinal direction of the vehicle.

Description of Related Art

In general, a vehicle has a vehicle compartment having a predetermined size capable of accommodating a driver or a fellow rider, and a vehicle compartment opening/closing door is provided in the vehicle body to open or close the vehicle compartment.

In the case of a passenger vehicle, the vehicle compartment opening/closing door includes a front door provided in the front in the longitudinal direction of the vehicle and a rear door provided in the rear in the longitudinal direction of the vehicle, and the front door and the rear door are usually rotatably provided in the vehicle body by hinges.

In the case of a van which may accommodate many people, the vehicle compartment opening/closing door slides back and forth in the longitudinal direction of the vehicle to open or close the vehicle compartment.

In the sliding-type vehicle compartment opening/closing door of the van, the vehicle compartment opening/closing door moves rearward in the longitudinal direction of the vehicle to open the vehicle compartment, while moving forward in the longitudinal direction of the vehicle to close the vehicle compartment. Therefore, it is advantageous in that the opening/closing space required for opening and closing the door is smaller than that of the hinge-type vehicle compartment opening/closing door such as the passenger vehicle, and the door opening formed in the vehicle body may be completely opened even in a narrow opening/closing space.

However, the conventional sliding-type vehicle compartment opening/closing door, as shown in FIG. 1, has a structure in which an upper rail 2, a center rail 3, and a lower rail 4 are mounted on the vehicle body 1 respectively, and rollers corresponding to the rails 2, 3 and 4 are mounted on a door panel.

In the instant case, due to the design of the vehicle, a space for the vehicle body and a door opening width to form the center rail may not be sufficient. Furthermore, marketability and aesthetic quality of the vehicle may deteriorate because a space for driving a center roller is exposed to the exterior of the vehicle body.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a sliding door device for a vehicle to prevent exposure of a center rail to the outside and to secure the door opening width by mounting the center rail instead of a center roller on the door panel.

Various aspects of the present disclosure are directed to providing a sliding door device for a vehicle including a door panel configured to open or close a door opening formed in a vehicle body, and a center rail mounted on a center portion of the door panel to extend in a longitudinal direction of the vehicle body. The center rail is configure to provide a path for a center roller mounted on a center portion of the vehicle body to move therealong, the door panel is covered by an upper trim at an upper side of the vehicle body and a lower trim at a lower side of the vehicle body, and a lower portion of the upper trim and an upper portion of the lower trim are disposed to overlap each other vertically. The center roller is mounted on a center roller mounting bracket including a first surface extending toward the vehicle body to be vertical to the door panel, a second surface bent from the first surface toward a lower side of the vehicle body, and a third surface extending from the second surface toward the vehicle body to be vertical to the door panel, and the center roller mounting bracket is disposed to be interposed and extend between the lower portion of the upper trim and the upper portion of the lower trim overlapping.

An upper roller and a lower roller may be mounted to be positioned at a side of the middle portion of the door opening of the door panel.

The center roller may be inserted inside an upper end portion of the center rail and mounted on the first surface to rotate according to movement of the center rail.

A pair of the center rollers may be provided to be disposed on the first surface side by side in the longitudinal direction of the vehicle body.

A rod bearing configured to contact with and support a lower end portion of the center rail to rotate according to movement of the center rail may be mounted on the second surface.

The third surface may be hinge-rotatably coupled to a vehicle body fixing member which is fixed on the vehicle body in the longitudinal direction of the vehicle body.

The vehicle body fixing member is coupled to the center roller mounting bracket by a hinge shaft provided in a direction vertical to the longitudinal direction of the vehicle body, and an elastic member configured to provide an elastic force upon hinge rotation of the center roller mounting bracket may be mounted around the hinge shaft.

The sliding door device for the vehicle according to various exemplary embodiments of the present disclosure may further include an upper roller mounted on an upper portion of the door panel and a lower roller mounted on a lower portion of the door panel.

The upper roller and the lower roller may be configured to move along an upper rail and a lower rail respectively mounted on an upper portion and a lower portion of the door opening of the vehicle body to extend in the longitudinal direction of the vehicle body.

According to various exemplary embodiments of the present disclosure, by mounting the center rail instead of the center roller on the door panel, it is possible to prevent exposure of the center rail to, the outside thereof, secure the door opening width, and configure a sliding door without restrictions in design.

Furthermore, by adopting the rod bearing that rolls and moves in contact with the lower end portion of the center rail, it is possible to prevent sagging and rattling of the door.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
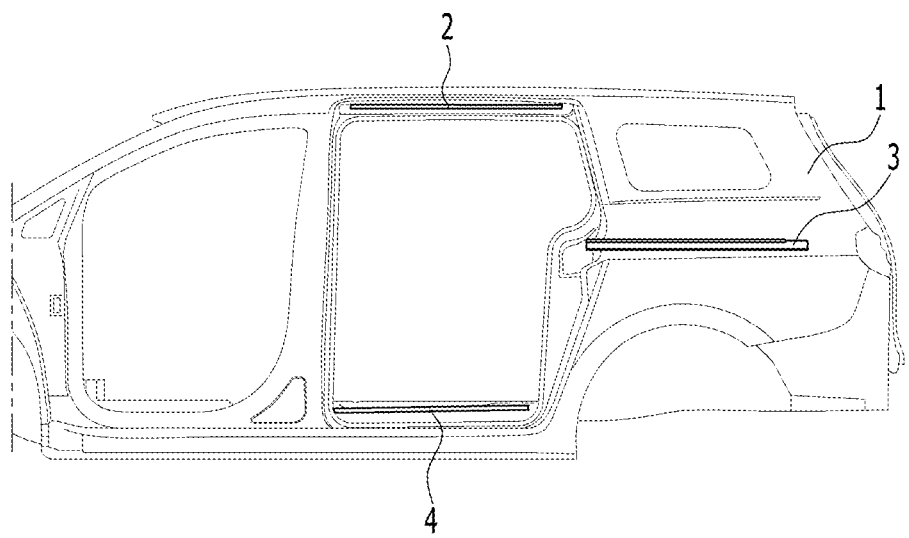
FIG. 1 is a diagram illustrating a state in which an upper rail, a center rail, and a lower rail are mounted on a vehicle body in a conventional sliding-type vehicle compartment opening/closing door structure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, with reference to the accompanying drawings, various exemplary embodiments of the present disclosure will be described in detail so that a person of an ordinary skill in the art to which an exemplary embodiment of the present disclosure pertains may easily implement the same. The present disclosure may be implemented in various different forms and is not limited to the exemplary embodiments described herein.

In addition, in various exemplary embodiments of the present disclosure, constituent elements having the same configuration are typically described in an exemplary embodiment with the same reference numerals, and only configurations different from the exemplary embodiment of the present disclosure will be described in other exemplary embodiments.

It is noted that the drawings are schematic and not drawn to scale. Relative dimensions and ratio of parts in the drawings are shown in enlarged or reduced size for clarity and convenience in the drawings, and any dimension is merely illustrative but not limiting. In addition, the same reference numerals are used to indicate similar features for the same structures, elements, or parts shown in two or more drawings. When a part is referred to as being "on" or "above" another part, the part may be directly on the other part or another part may be involved therebetween.

Various exemplary embodiments of the present disclosure specifically represents various exemplary embodiments of the present disclosure. As a result, numerous variations of the diagram are expected. Accordingly, the exemplary embodiment of the present disclosure is not limited to a specific form of the illustrated area, and includes, for example, modification in the form by manufacturing.

Hereinafter, a structure of a sliding door device for a vehicle according to various exemplary embodiments of the present disclosure will be described in detail with reference to the accompanying drawings.

Figure 2:
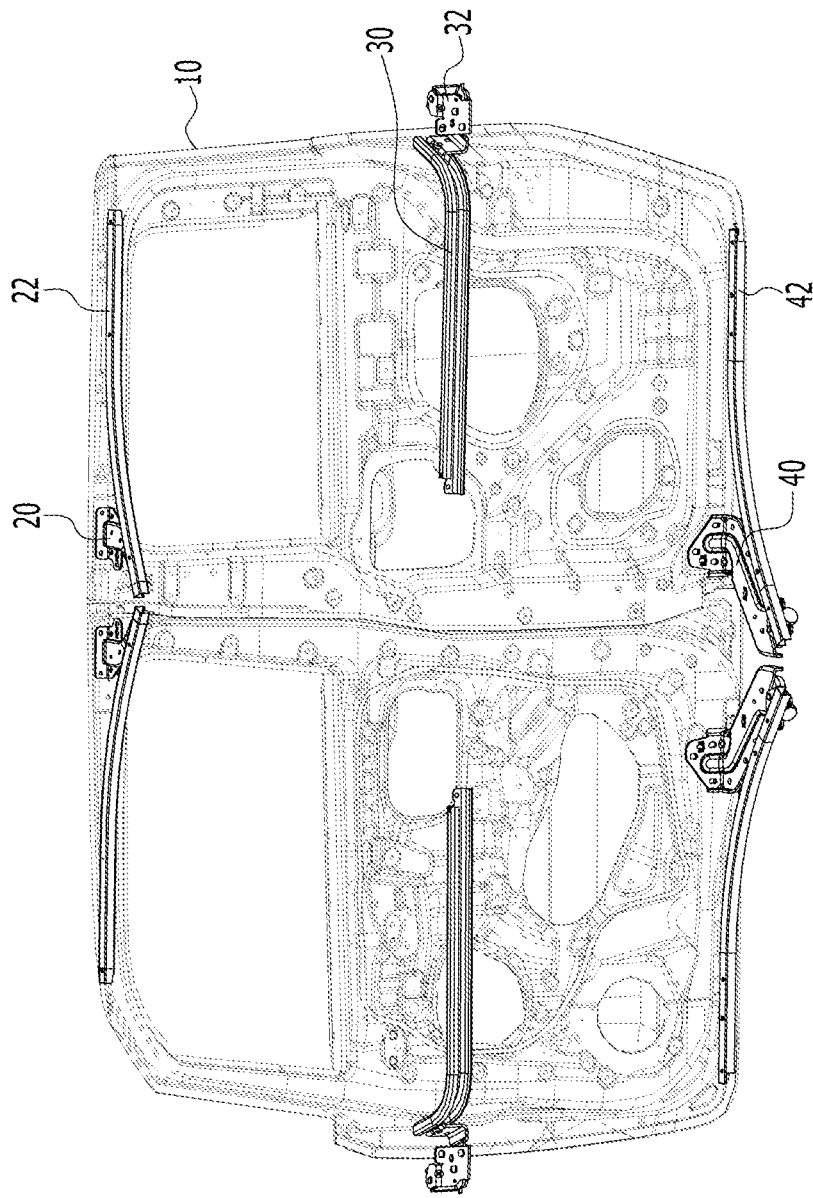
FIG. 2 is a diagram schematically illustrating a sliding door device for a vehicle according to various exemplary embodiments of the present disclosure.

FIG. 2 is a diagram schematically illustrating the sliding door device for a vehicle according to various exemplary embodiments of the present disclosure.

Referring to FIG. 2, a sliding door device 100 for a vehicle according to various exemplary embodiments of the present disclosure includes a door panel 10 configured to open or close a door opening formed in a vehicle body, a center rail 30 mounted on a center portion of the door panel 10 to extend in a longitudinal direction of the vehicle body, an upper roller 20 mounted on an upper portion of the door panel 10, and a lower roller 40 mounted on a lower portion of the door panel 10.

In the vehicle body, a center roller 32, an upper rail 22, and a lower rail 42 are provided at positions corresponding to the center rail 30, the upper roller 20, and the lower roller 40, respectively.

The center roller 32 is mounted on a center portion of the vehicle body and may move along the center rail 30 mounted on the door panel 10. Furthermore, the upper roller 20 and the lower roller 40 mounted on the door panel 10 may move along the upper rail 22 and the lower rail 42 mounted on the upper and lower portions of the vehicle body to extend in the longitudinal direction of the vehicle body, respectively.

The upper roller 20 and the lower roller 40 may be mounted to be positioned at a side of the middle portion of the door opening of the door panel 10.

Figure 3:
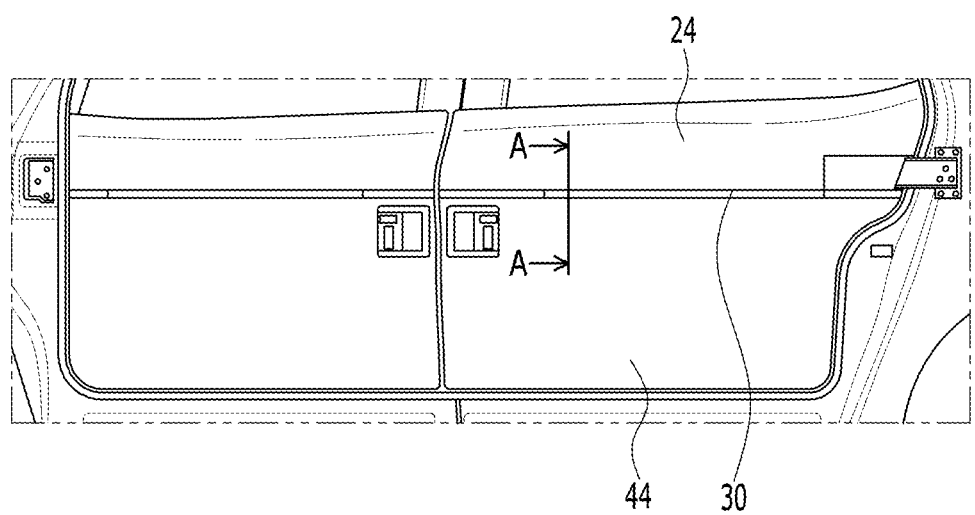
FIG. 3 is a diagram illustrating a view from the interior of a vehicle of a sliding door device for the vehicle according to various exemplary embodiments of the present disclosure.
Figure 4:
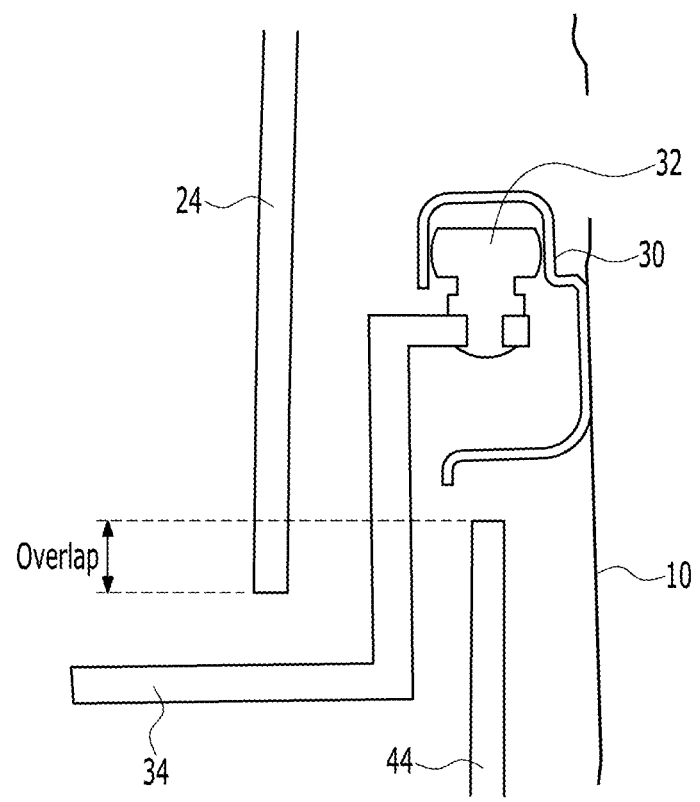
FIG. 4 is a cross-sectional view schematically illustrating a state cut along the line 'A'-'A' of FIG. 3.

FIG. 3 is a diagram illustrating a view from the interior of a vehicle of a sliding door device for the vehicle according to various exemplary embodiments of the present disclosure, and FIG. 4 is a cross-sectional view schematically illustrating a state cut along the line 'A'-'A' of FIG. 3.

Referring to FIG. 3, an upper trim 24 on the upper side of the vehicle body and a lower trim 44 on the lower side of the vehicle body are provided on the door panel 10 on an internal surface of the vehicle, and the door panel 10 may be covered by the upper trim 24 and the lower trim 44. Between the upper trim 24 and the lower trim 44, the center rail 30 is mounted on the door panel 10 to extend in the longitudinal direction of the vehicle body.

Referring to FIG. 4, a lower portion of the upper trim 24 and an upper portion of the lower trim 44 may be disposed to overlap vertically. The center roller 32 may be mounted on a center roller mounting bracket 34, and the center roller mounting bracket 34 may be disposed to be interposed and extend between the lower portion of the upper trim 24 and the upper portion of the lower trim 44 overlapping.

The center rail 30 is mounted on the door panel 10, and the center roller 32 may be inserted inside an upper end portion of the center rail 30 to rotate as the center rail 30 mounted on the door panel 10 moves.

Figure 5:
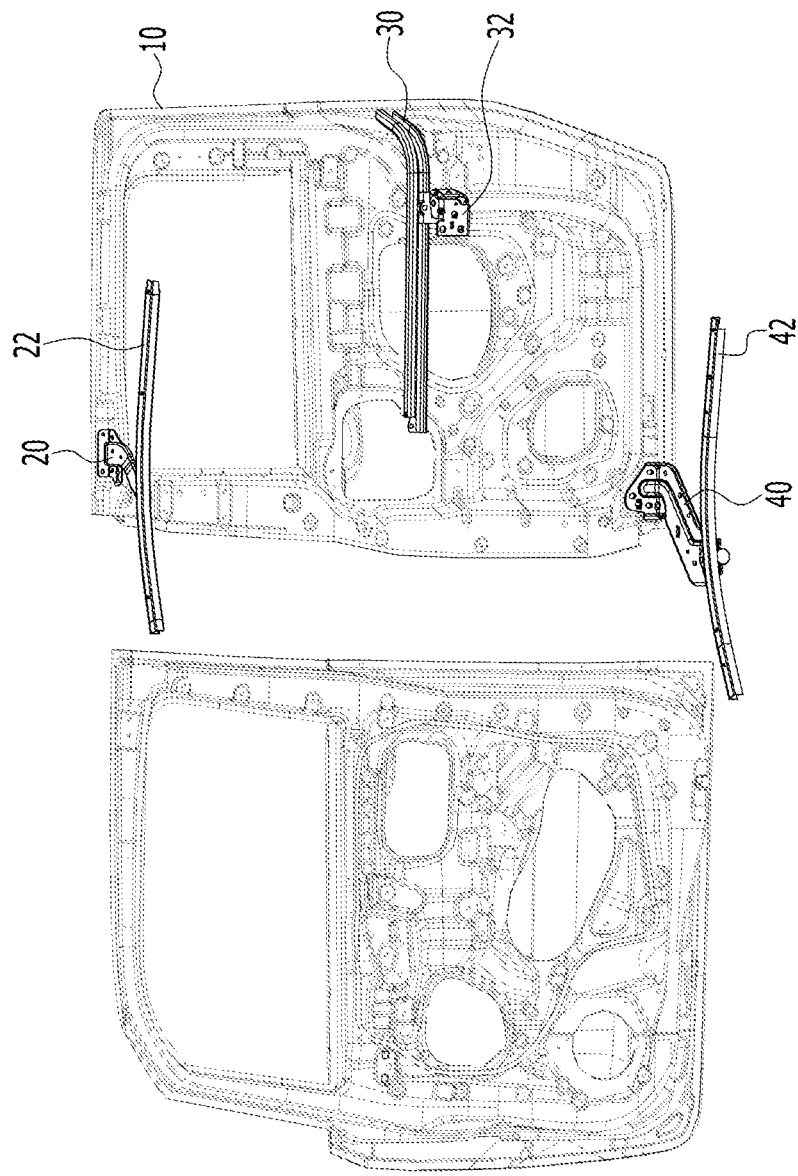
FIG. 5 is a diagram illustrating an intermediate open state of a sliding door device for a vehicle according to various exemplary embodiments of the present disclosure.
Figure 6:
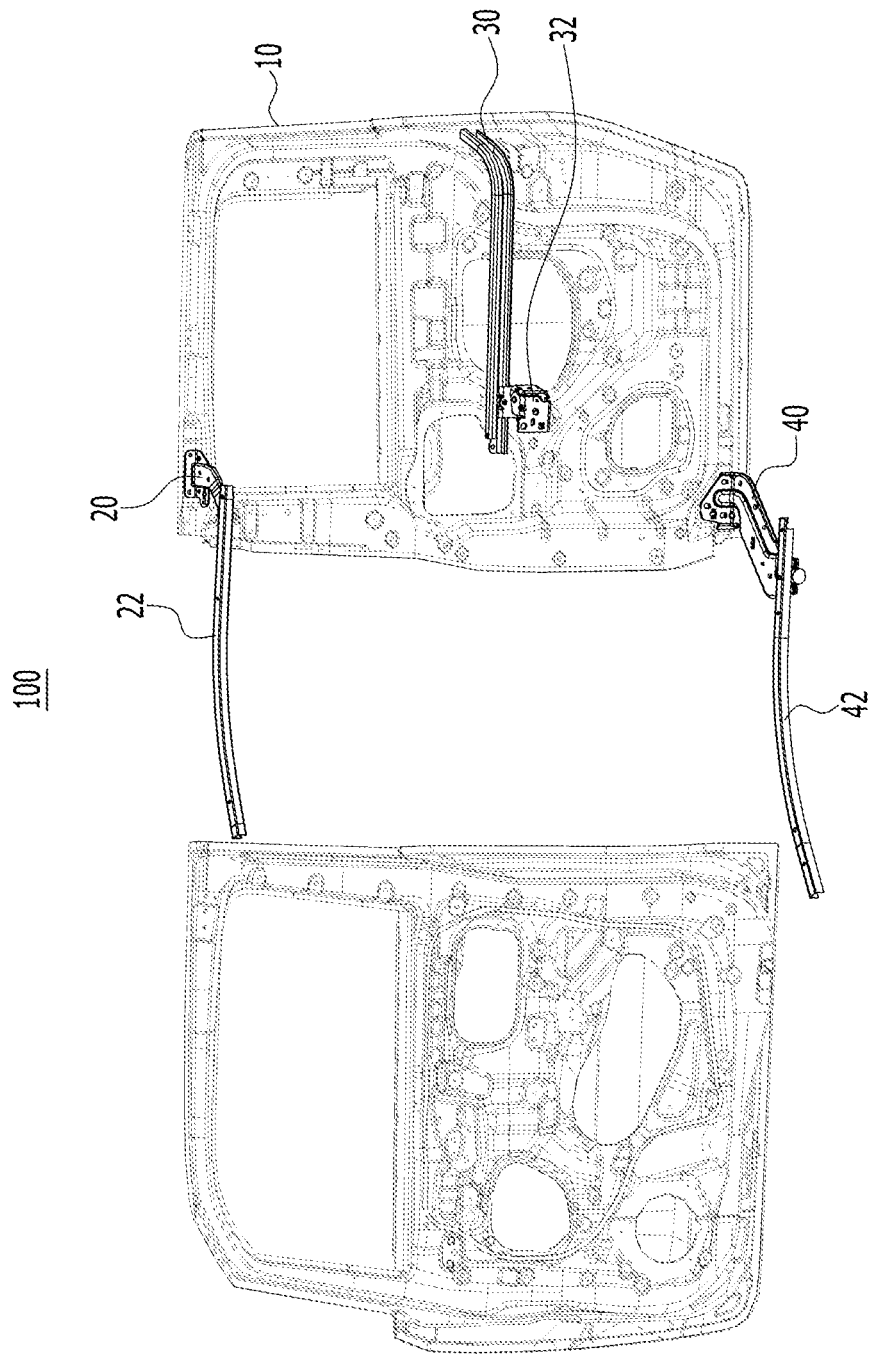
FIG. 6 is a diagram illustrating a full open state of a sliding door device for a vehicle according to various exemplary embodiments of the present disclosure.

FIG. 5 is a diagram illustrating an intermediate open state of a sliding door device for a vehicle according to various exemplary embodiments of the present disclosure, and FIG. 6 is a diagram illustrating a full open state of the sliding door device for the vehicle according to various exemplary embodiments of the present disclosure.

As shown in FIG. 5, when the door starts to open, the upper roller 20, the lower roller 40, and the center rail 30 move together in accordance with the movement of the door panel 10. The upper rail 22, the lower rail 42, and the center roller 32 are fixed to the vehicle body, and the upper roller 20, the lower roller 40, and the center rail 30 are moved in engagement with the upper rail 22, the lower rail 42, and the center roller 32 fixed to the corresponding position, respectively.

Referring to FIG. 5, the upper roller 20 and the lower roller 40 may be provided to be positioned at the side of the middle portion of the door opening of the door panel 10, and the center roller 32 may be provided to be positioned at a portion spaced from the door opening of the vehicle body with a predetermined distance. In a state where the door is closed, the upper roller 20 and the lower roller 40 may be positioned at the left end portions of the upper rail 22 and the lower rail 42, and the center roller 32 may be positioned at the right end portion of the center rail 30.

As the door panel 10 moves to the right, the upper roller 20, the lower roller 40, and the center rail 30 move, so that the upper roller 20 and the lower roller 40 move gradually toward the right side of the upper rail 22 and the lower rail 42, and the center roller 32 is gradually positioned toward the left side of the center rail 30.

As shown in FIG. 6, when the door opening is completed, the upper roller 20 and the lower roller 40 are positioned at the right end portions of the upper rail 22 and the lower rail 42, and the center roller 32 is positioned at the left end portion of the center rail 30.

Figure 7:
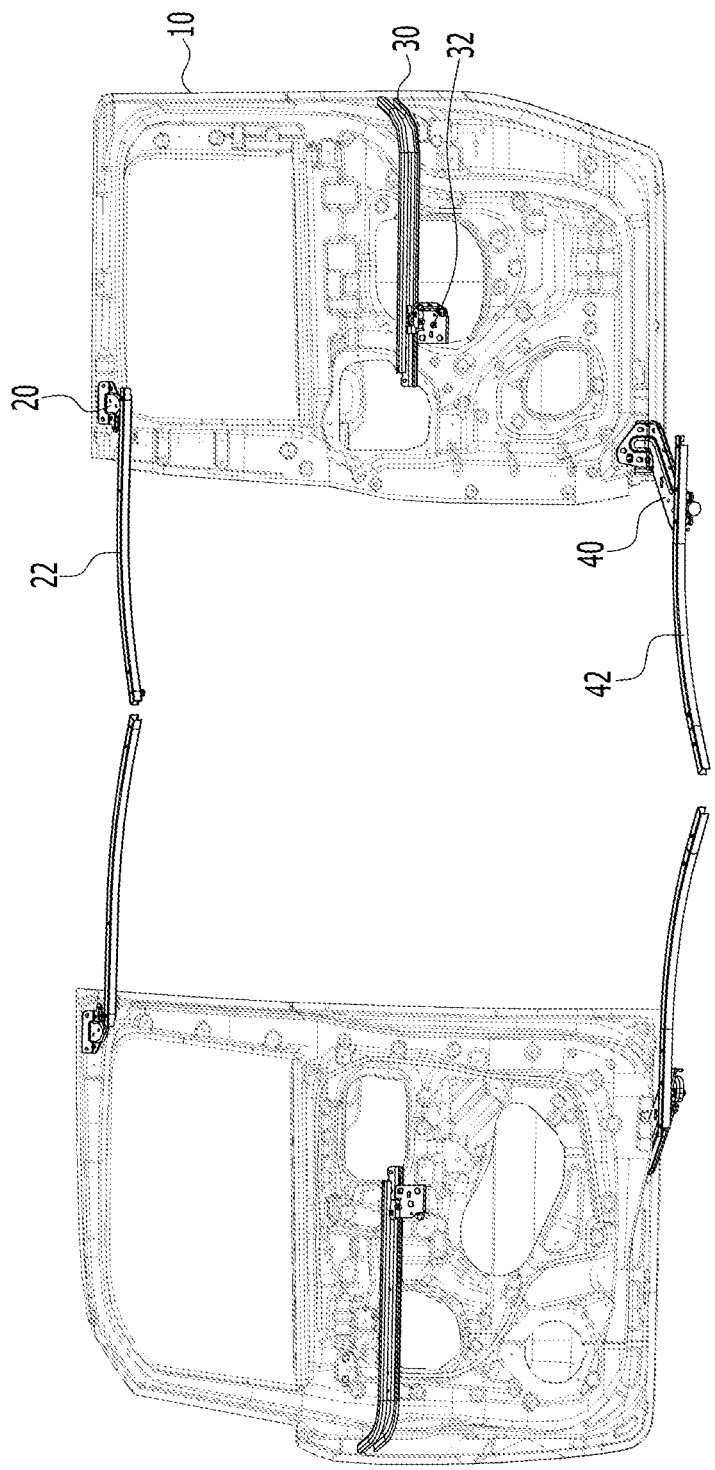
FIG. 7 is a diagram illustrating a full open state applied to both a front door and a rear door of a sliding door device for a vehicle according to various exemplary embodiments of the present disclosure.

FIG. 7 is a diagram illustrating a full open state applied to both a front door and a rear door of a sliding door device for a vehicle according to various exemplary embodiments of the present disclosure.

The sliding door device for a vehicle described with reference to FIG. 5 and FIG. 6 is about a structure applied only to the rear door, but may be applied to both the front door and the rear door as shown in FIG. 7. Based on FIG. 7, an upper roller, a lower roller, and a center rail may also be provided on the left door panel, and an upper rail, a lower rail, and a center roller may be provided on the vehicle body at positions corresponding thereto. Because movements of the rollers and the rails according to the movement of the left door panel is the same as those described with reference to FIG. 5 and FIG. 6, a description thereof will be omitted.

Figure 8:
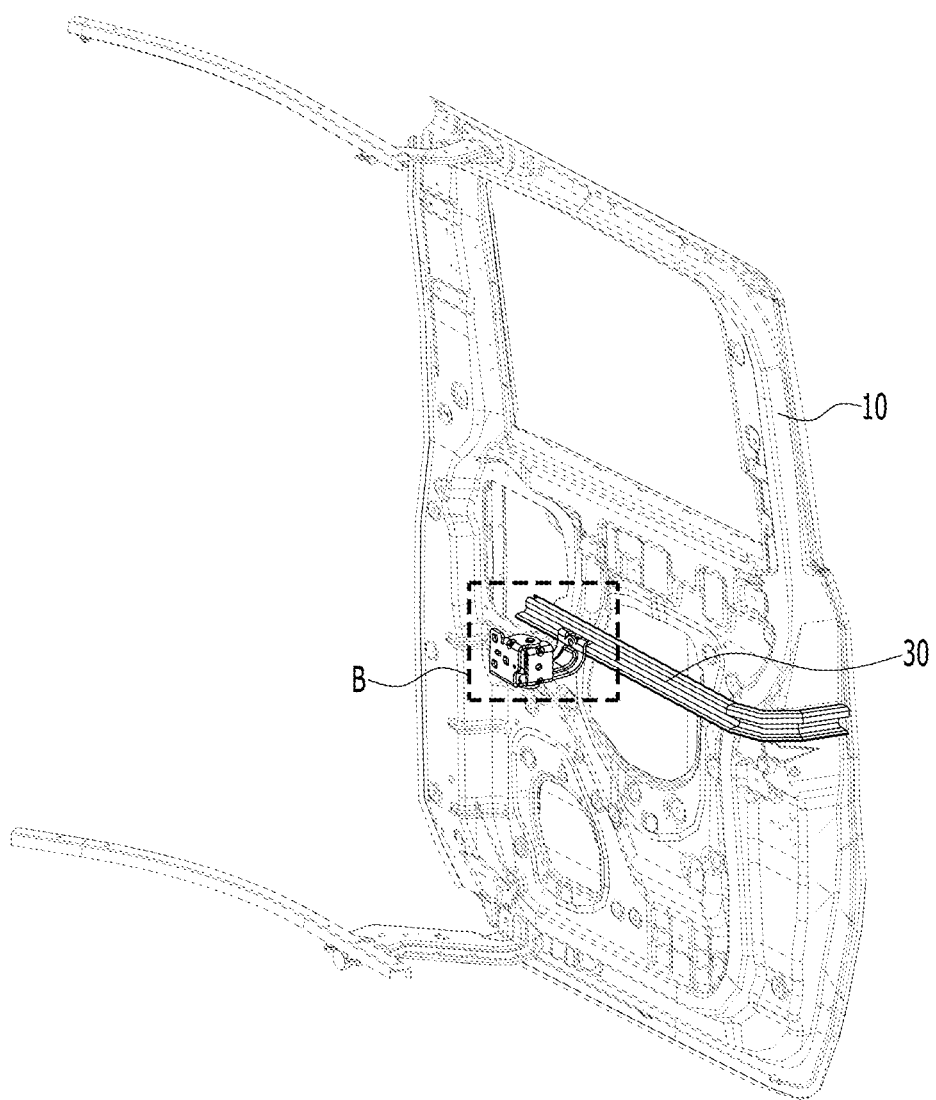
FIG. 8 is a diagram illustrating a coupling state of a center rail and a center roller of a sliding door device for a vehicle according to various exemplary embodiments of the present disclosure.
Figure 9:
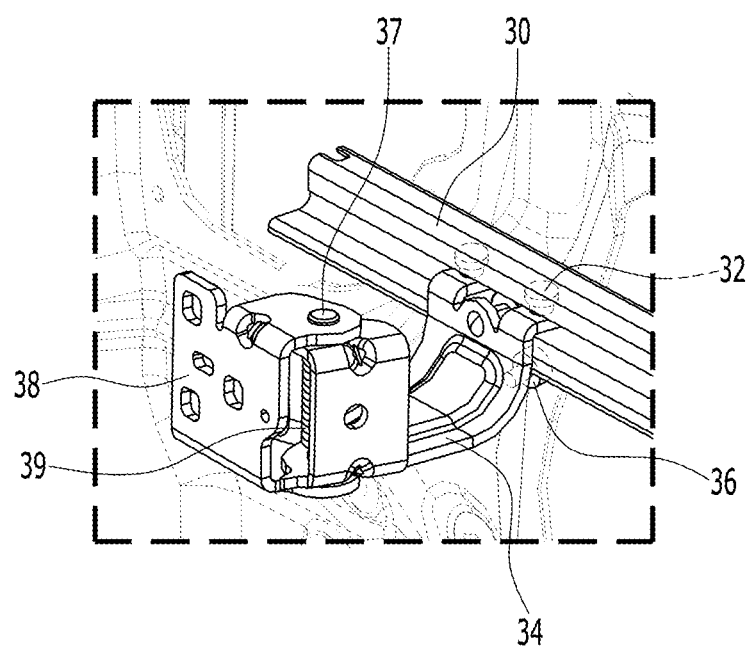
FIG. 9 is an enlarged view of part 'B' of FIG. 8.

FIG. 8 is a diagram illustrating a coupling state of a center rail and a center roller of a sliding door device for a vehicle according to various exemplary embodiments of the present disclosure, and FIG. 9 is an enlarged view of portion 'B' of FIG. 8.

Referring to FIG. 8 and FIG. 9, the center rail 30 may extend in the longitudinal direction of the vehicle body and may be mounted to the door panel 10 in a curved form from an end portion of the door panel 10 to the outside of the vehicle body. Due to the shape of the center rail 30, the door may move in the longitudinal direction of the vehicle body and then move toward the outside of the vehicle body when the door is opened.

The center roller mounting bracket 34 provided on the vehicle body includes a first surface extending toward the vehicle body to be vertical to the door panel 10, a second surface bent from the first surface toward the lower side of the vehicle body, and a third surface extending from the second surface toward the vehicle body to be vertical to the door panel 10.

The center roller 32 may be rotatably mounted on the first surface of the center roller mounting bracket 34 and may be inserted into and in contact with the inside of the upper end portion of the center rail 30. Accordingly, the center roller 32 may be rotated in accordance with the movement of the center rail 30.

Furthermore, a pair of the center rollers 32 may be provided to be disposed side by side in the longitudinal direction of the vehicle body on the first surface of the center roller mounting bracket 34. The number and disposition form of the center rollers 32 may be modified in accordance with the shape of the center rail 30 and the center roller mounting bracket 34.

Furthermore, a rod bearing 36 configure to contact with and support a lower end portion of the center rail 30 to rotate according to movement of the center rail 30 may be mounted on the second surface of the center roller mounting bracket 34. The rod bearing 36 may support the center rail 30 to prevent the door panel 10 from sagging downward and to stably support the door panel 10.

Furthermore, a vehicle body fixing member 38 is provided on the vehicle body, and the third surface of the center roller mounting bracket 34 is coupled to the vehicle body fixing member 38. As the door panel 10 moves, the center roller mounting bracket 34 may be hingedly rotated around the vehicle body fixing member 38 in the longitudinal direction of the vehicle body.

A hinge shaft 37 is provided on the vehicle body fixing member 38 in a direction vertical to the longitudinal direction of the vehicle body, and the center roller mounting bracket 34 is coupled to the hinge shaft 37. An elastic member 39 may be mounted around the hinge shaft 37 to provide an elastic force upon hinge-rotation of the center roller mounting bracket 34. The elastic member 39 may be formed of a spring wound around the hinge shaft 37. The elastic member 39 may be configured to mitigate sudden movement of the door upon the opening and closing operation of the door.

Accordingly, according to various exemplary embodiments of the present disclosure, by mounting the center rail instead of the center roller on the door panel, it is possible to prevent exposure of the center rail to, the outside thereof, secure the door opening width, and configure the sliding door without restrictions in the design.

Furthermore, by adopting the rod bearing that rolls by being in contact with the lower end portion of the center rail, sagging and rattling of the door may be prevented.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A sliding door apparatus for a vehicle, the sliding door apparatus comprising:
    a door panel configured to open or close a door opening formed in a vehicle body;
    a center rail mounted on a center portion of the door panel to extend in a longitudinal direction of the vehicle body;
    a center roller;
    an upper trim provided at an upper side of the vehicle body and a lower trim provided at a lower side of the vehicle body; and
    a center roller mounting bracket,
    wherein the center rail provides a path for the center roller mounted on a center portion of the vehicle body to move therealong,
    wherein the door panel is covered by the upper trim at the upper side of the vehicle body and the lower trim at the lower side of the vehicle body,
    wherein a lower portion of the upper trim and an upper portion of the lower trim are disposed to overlap each other vertically,
    wherein the center roller is mounted on the center roller mounting bracket including a first surface extending toward the vehicle body to be vertical to the door panel, a second surface bent from the first surface toward a lower side of the vehicle body, and a third surface extending from the second surface toward the vehicle body to be vertical to the door panel,
    wherein the center roller mounting bracket is disposed to be interposed and extend between the lower portion of the upper trim and the upper portion of the lower trim, and
    wherein the sliding door apparatus further includes a rod bearing configured to be located outside a lower end portion of the center rail, contact with and support the lower end portion of the center rail upwards to rotate according to movement of the center rail and mounted on the second surface of the center roller mounting bracket, thereby preventing the door panel from sagging downward and stably supporting the door panel.

2. The sliding door apparatus of claim 1, wherein the lower portion of the upper trim, the center roller mounting bracket and the upper portion of the lower trim are disposed in series to overlap each other vertically.

3. The sliding door apparatus of claim 1, further including an upper roller and a lower roller mounted to be positioned at a side of a middle portion of the door opening of the door panel.

4. The sliding door apparatus of claim 1, wherein the center roller is inserted inside an upper end portion of the center rail and mounted on the first surface to rotate according to the movement of the center rail mounted on the door panel.

5. The sliding door apparatus of claim 1, wherein a pair of center rollers are provided to be disposed on the first surface side by side in the longitudinal direction of the vehicle body.

6. The sliding door apparatus of claim 1, wherein the third surface is hinge-rotatably coupled to a vehicle body fixing member which is fixed on the vehicle body in the longitudinal direction of the vehicle body.

7. The sliding door apparatus of claim 6, wherein the vehicle body fixing member is rotatably coupled to the center roller mounting bracket by a hinge shaft provided in a direction vertical to the longitudinal direction of the vehicle body.

8. The sliding door apparatus of claim 7, further including an elastic member configured to provide an elastic force upon hinge rotation of the center roller mounting bracket and mounted around the hinge shaft.

9. The sliding door apparatus of claim 1, further including:
    an upper roller mounted on an upper portion of the door panel; and
    a lower roller mounted on a lower portion of the door panel.

10. The sliding door apparatus of claim 9, further including an upper rail and a lower rail respectively mounted on an upper portion and a lower portion of the door opening of the vehicle body to extend in the longitudinal direction of the vehicle body,
    wherein the upper roller and the lower roller are configured to move along the upper rail and the lower rail, respectively.

* * * * *